(12) United States Patent
Lin et al.

(10) Patent No.: US 9,804,775 B2
(45) Date of Patent: Oct. 31, 2017

(54) ELECTRONIC DEVICE AND METHOD FOR MANAGING USER INTERFACE

(71) Applicant: FIH (HONG KONG) LIMITED, Kowloon (HK)

(72) Inventors: Yu-Hsien Lin, New Taipei (TW); Hung-Ling Wei, New Taipei (TW)

(73) Assignee: FIH (HONG KONG) LIMITED, Kowloon (HK)

( * ) Notice: Subject to any disclaimer, the term of this patent is extended or adjusted under 35 U.S.C. 154(b) by 337 days.

(21) Appl. No.: 14/713,741

(22) Filed: May 15, 2015

(65) Prior Publication Data

US 2016/0124631 A1   May 5, 2016

(30) Foreign Application Priority Data

Oct. 30, 2014 (TW) .............................. 103137528 A

(51) Int. Cl.
  *G06F 3/045*   (2006.01)
  *G06F 3/0488*  (2013.01)
  *G06F 3/0481*  (2013.01)
  *G06F 3/041*   (2006.01)

(52) U.S. Cl.
  CPC ........ *G06F 3/04883* (2013.01); *G06F 3/0414* (2013.01); *G06F 3/04817* (2013.01); *G06F 3/04886* (2013.01); *G06F 2203/04808* (2013.01)

(58) Field of Classification Search
  CPC ............ G06F 3/04883; G06F 3/04817; G06F 3/04886; G06F 3/0481; G06F 3/0482; G06F 3/0484; G06F 3/0488; G06F 2203/04808
  See application file for complete search history.

(56) References Cited

U.S. PATENT DOCUMENTS 9,395,913 B2 *  7/2016  Lim .................... G06F 3/0488
9,678,661 B2 *  6/2017  Endo .................. G06F 3/04883
9,679,121 B2 *  6/2017  Kapp .................. G06F 21/31

* cited by examiner

*Primary Examiner* — Vijay Shankar
(74) *Attorney, Agent, or Firm* — Steven Reiss

(57) ABSTRACT

A method for managing user interface of an electronic device includes detecting touch points on a back panel of the electronic device within a predetermined time interval when the electronic device is unlocked. When a first number of the detected touch points on a left part of a back panel is more than a second number of the detected touch points on a right part of the back panel, icons are displayed on a right part of a display device of the electronic device. When a first number of the detected touch points on the left part of the back panel is less than the second number of the detected touch points on the right part of the back panel, the icons are displayed on a left part of the display device.

12 Claims, 3 Drawing Sheets

ELECTRONIC DEVICE AND METHOD FOR MANAGING USER INTERFACE

CROSS-REFERENCE TO RELATED APPLICATIONS

This application claims priority to Taiwanese Patent Application No. 103137528 filed on Oct. 30, 2014, the contents of which are incorporated by reference herein.

FIELD

The subject matter herein generally relates to interface management technology, and particularly to managing a user interface of an electronic device.

BACKGROUND

When a user interface of an electronic device (e.g., a smart phone or a tablet computer) is displayed on a display of the electronic device, positions of icons are stationary and need to be moved manually by a user.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
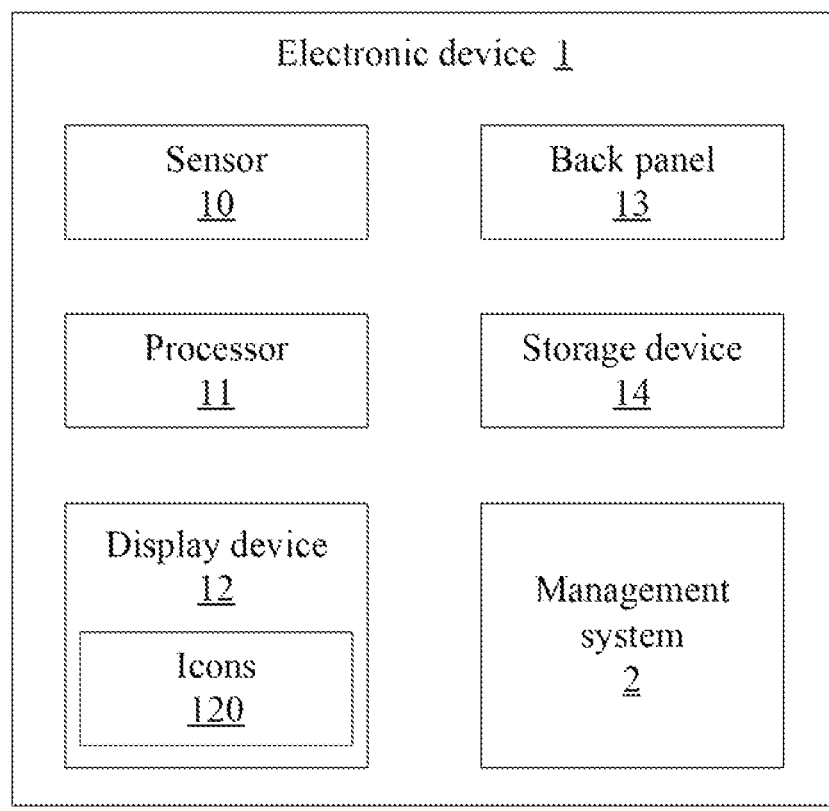
FIG. 1 is a block diagram of one embodiment of an electronic device including a managing system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like.

FIG. 1 illustrates a block diagram of one embodiment of an electronic device. In at least one embodiment as shown in FIG. 1, an electronic device 1 includes, but is not limited to, a management system 2, a sensor 10, at least one processor 11, a display device 12, a back panel 13, and a storage device 14. The electronic device 1 can be a tablet computer, a smart phone, a personal digital assistant (PDA), or any other suitable electronic device. FIG. 1 illustrates only one example of the electronic device 1 that can include more or fewer components than illustrated, or have a different configuration of the various components in other embodiments.

In at least one embodiment, the sensor 10 can detect touch points on the back panel 13 of the electronic device 1. In some embodiments, the sensor 10 can be a pressure sensor or other suitable sensors. The at least one processor 11 can be a central processing unit (CPU), a microprocessor, or other data processor chip that performs functions of the management system 2 in the electronic device 1. The display device 12 provides a transverse mode and a longitudinal mode to display icons 120 on a user interface. The icons 120 can be function buttons to invoke applications installed in the electronic device 1 or invoke specified functions of the electronic device 1, such as a home button, a camera button.

In at least one embodiment, the display device 12 can be a liquid-crystal display (LCD), a light emitting diode (LED), or an organic LED.

In at least one embodiment, the storage device 14 can include various types of non-transitory computer-readable storage medium. For example, the storage device 14 can be an internal storage system, such as a flash memory, a random access memory (RAM) for temporary storage of information, and/or a read-only memory (ROM) for permanent storage of information. The storage device 14 can also be an external storage system, such as a hard disk, a storage card, or a data storage medium.

Figure 2:
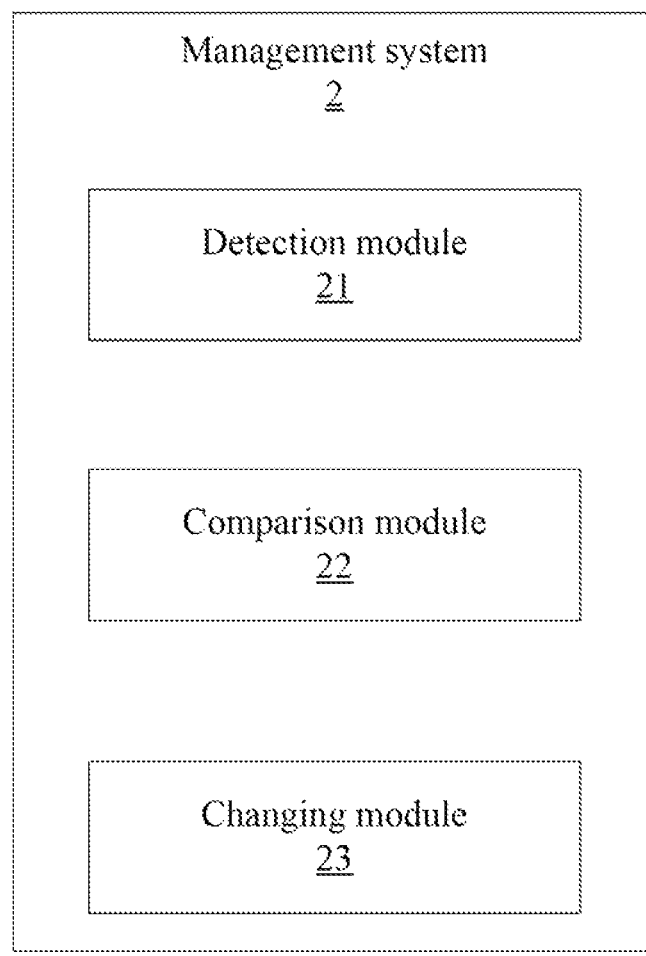
FIG. 2 is a block diagram of one embodiment of function modules of the managing system in the electronic device in FIG. 1.

FIG. 2 is a block diagram of one embodiment of function modules of the management system. In at least one embodiment, the management system 2 can include a detection module 21, a comparison module 22, and a changing module 23. The function modules 21, 22 and 23 can include computerized codes in the form of one or more programs, which are stored in the storage device 14 of the electronic device 1. The at least one processor 11 executes the computerized codes to provide functions of the function modules 21-23.

The detection module 21 detects touch points on the back panel 13 within a predetermined time interval (e.g., three seconds) when the electronic device 1 is unlocked. In at least one embodiment, the back panel 13 can be divided into two parts, including a right part and a left part. The detection module 21 can detect touch points on the left part and touch points on the right part.

The comparison module 22 compares a first number of the detected touch points on the left part of the back panel 13 with a second number of the detected touch points on the right part of the back panel 13.

The changing module 23 changes locations of one or more icons 120 displayed on the display device 12 according to a result of the comparing of the first number with the second number In at least one embodiment, the display device 12 also can be divided into two parts including a right part and a left part. The changing module 23 displays the icons 120 on the right part of the display device 12, when the first number of the detected touch points on the left part is more than the second number of the detected touch points on the right part. The changing module 23 displays the icons 120 on the left part of the display device 12, when the first number of the detected touch points on the left part is less than the second number of the detected touch points on the right part.

In at least one embodiment, when there is not enough space in the left part or the right part of the display device 12 to show the icons 120, the changing module 23 reduces sizes of the icons 120 according to a first predetermined proportion (e.g., fifty percent). The changing module 23 can repeat reducing the sizes of the icons 120 according to the first predetermined proportion until all of the icons 120 are displayed on the left part or the right part of the display device 12. In other embodiments, the changing module 23 can reduce a space between each two of the icons 120 according to a second predetermined proportion (e.g., fifty percent). The changing module 23 can repeat reducing the space between each icon 120 according to the second predetermined proportion until all of the icons 120 are displayed on the left part or the right part of the display device 12.

Figure 3:
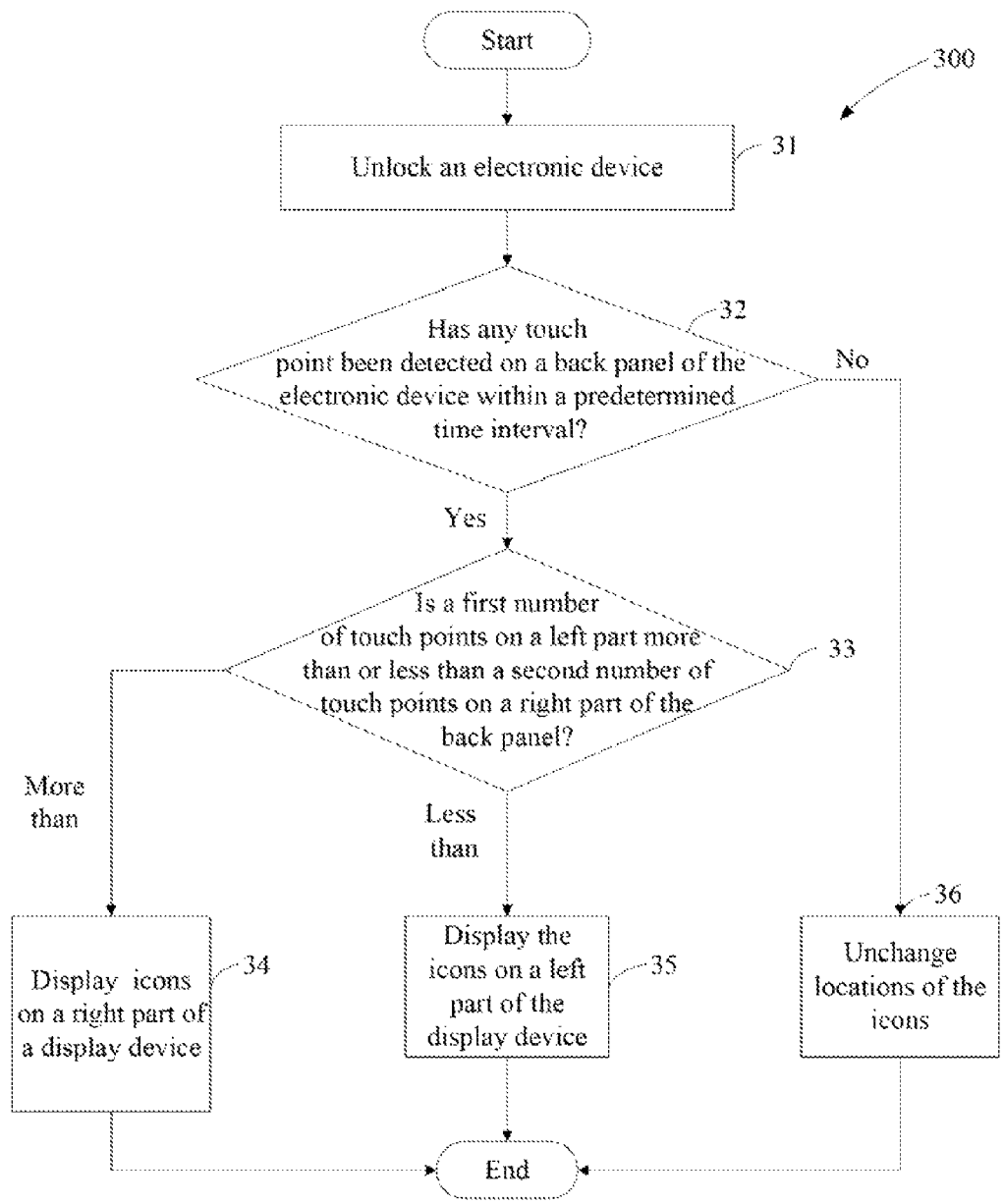
FIG. 3 illustrates a flowchart of one embodiment of a method for managing user interface of the electronic device in FIG. 1.

Referring to FIG. 3, a flowchart is presented in accordance with an example embodiment. The example method 300 is provided by way of example, as there are a variety of ways to carry out the method. The example method 300 described below can be carried out using the configurations illustrated in FIG. 1 and FIG. 2, for example, and various elements of these figures are referenced in explaining example method 300. Each block shown in FIG. 3 represents one or more processes, methods, or subroutines, carried out in the example method 300. Additionally, the illustrated order of blocks is by example only and the order of the blocks can be changed. The example method 300 can begin at block 31. Depending on the embodiment, additional blocks can be added, others removed, and the ordering of the blocks can be changed.

In block 31, the electronic device 1 is unlocked.

In block 32, a detection module determines whether any touch point has been detected on the back panel 13 of the electronic device 1 within a predetermined time interval. As mentioned above, the back panel 13 can be divided into two parts, including a right part and a left part. When the detection module detects the touch points on the back panel 13 within the predetermined time interval, block 33 is implement. When the detection module has not detected any touch point on the back panel 13 within the predetermined time interval, block 36 is implement.

In block 33, a comparison module determines whether a first number of touch points on the left part of the back panel 13 is more than or less than a second number of touch points on the right part of the back panel 13. If the comparison module determines that the first number of touch points on the left part of the back panel 13 is more than the second number of touch points on the right part of the back panel 13, the procedure goes to block 34. If the comparison module determines that the first number of touch points on the left part of the back panel 13 is less than the second number of touch points on the right part of the back panel 13, the procedure goes to block 35.

In block 34, a changing module displays the icons 120 on a right part of the display device 12.

In block 35, the changing module displays the icons 120 on a left part of the display device 12.

In block 36, the changing module does not change locations of the icons 120.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An electronic device, comprising: a display device; a back panel; at least one processor; and a storage device that stores one or more programs which, when executed by the at least one processor, cause the at least one processor to: detect touch points on the back panel within a predetermined time interval when the electronic device is unlocked; compare a first number of the detected touch points on a left part of the back panel with a second number of the detected touch points on a right part of the back panel; and change locations of one or more icons on the display device according to a result of the comparing of the first number with the second number;

wherein the locations of one or more icons are changed by: when the first number of the detected touch points on the left part of the back panel is more than the second number of the detected touch points on the right part of the back panel, displaying the icons on a right part of the display device; or when the first number of the detected touch points on the left part of the back panel is less than the second number of the detected touch points on the right part of the back panel, displaying the icons on a left part of the display device.

2. The electronic device according to claim 1, when the left part or the right part of the display device has not enough space to show the icons, further comprising: reducing sizes of the functions icons according to a first predetermined proportion until all of the icons are displayed on the left part or the right part of the display device.

3. The electronic device according to claim 1, when the left part or the right part of the display device has not enough space to show the icons, further comprising: reducing a space between each two of the icons according to a second predetermined proportion until all of the icons are displayed on the left part or the right part of the display device.

4. The electronic device according to claim 1, wherein the electronic device further comprises a pressure sensor to detect the touch points on the back panel.

5. A method for managing a user interface of an electronic device, the electronic device comprising a display device and a back panel, the method comprising: detecting touch points on the back panel within a predetermined time interval when the electronic device is unlocked; comparing a first number of the detected touch points on a left part of the back panel with a second number of the detected touch points on a right part of the back panel; and changing locations of one or more icons on the display device according to a result of the comparing of the first number with the second number;

wherein the locations of one or more icons are changed by: when the first number of the detected touch points on the left part of the back panel is more than the second number of the detected touch points on the right part of the back panel, displaying the icons on a right part of the display device; or when the first number of the detected touch points on the left part of the back panel is less than the second number of the detected touch points on the right part of the back panel, displaying the icons on a left part of the display device.

6. The method according to claim 5, when the left part or the right part of the display device has not enough space to show the icons, further comprising: reducing sizes of the functions icons according to a first predetermined proportion until all of the icons are displayed on the left part or the right part of the display device.

7. The method according to claim 5, when the left part or the right part of the display device has not enough space to show the icons, further comprising: reducing a space between each two of the icons according to a second predetermined proportion until all of the icons are displayed on the left part or the right part of the display device.

8. The method according to claim 5, wherein the electronic device comprises a pressure sensor to detect the touch points on the back panel.

9. A non-transitory storage medium having stored thereon instructions that, when executed by at least one processor of an electronic device, causes the at least one processor to perform a method for managing a user interface of the electronic device, the electronic device comprising a display device and a back panel, wherein the method comprises: detecting touch points on the back panel within a predetermined time interval when the electronic device is unlocked; comparing a first number of the detected touch points on a left part of the back panel with a second number of the detected touch points on a right part of the back panel; and changing locations of one or more icons on the display device according to a result of the comparing of the first number with the second number;

one or more icons are changed by: when the first number of the detected touch points on the left part of the back panel is more than the second number of the detected touch points on the right part of the back panel, displaying the icons on a right part of the display device; or when the first number of the detected touch points on the left part of the back panel is less than the second number of the detected touch points on the right part of the back panel, displaying the icons on a left part of the display device.

10. The non-transitory storage medium according to claim 9, when the left part or the right part of the display device has not enough space to show the icons, further comprising: reducing sizes of the functions icons according to a first predetermined proportion until all of the icons are displayed on the left part or the right part of the display device.

11. The non-transitory storage medium according to claim 9, when the left part or the right part of the display device has not enough space to show the icons, further comprising: reducing a space between each two of the icons according to a second predetermined proportion until all of the icons are displayed on the left part or the right part of the display device.

12. The non-transitory storage medium according to claim 9, wherein the electronic device comprises a pressure sensor to detect the touch points on the back panel.

\* \* \* \* \*